United States Patent [19]

Asaka et al.

[11] Patent Number: 5,570,285
[45] Date of Patent: Oct. 29, 1996

[54] METHOD AND APPARATUS FOR AVOIDING OBSTACLES BY A ROBOT

[76] Inventors: Shunichi Asaka, 1-10-25, Kotobuki-sou 203, Sounan, Sagamihara-shi, Kanagawa-ken, 288; Shigeki Ishikawa, 6-17-7, Casa de R10 4F, Ebara, Shinagawa-ku, Tokyo, 142, both of Japan

[21] Appl. No.: 305,543

[22] Filed: Sep. 14, 1994

[30] Foreign Application Priority Data

Sep. 12, 1993 [JP] Japan .................................. 5-309255

[51] Int. Cl.$^6$ ................................................ G06F 165/00
[52] U.S. Cl. .................... 364/424.02; 364/460; 364/461; 180/169
[58] Field of Search .............................. 364/424.02, 444, 364/460, 461; 318/587; 180/167, 168, 169; 395/81, 88, 90, 900, 905; 348/118, 119

[56] References Cited

U.S. PATENT DOCUMENTS 4,751,658  6/1988  Kadonoff et al. ................... 364/424.01
5,170,352  12/1992  McTamaney et al. ............. 364/424.02
5,400,244  3/1995  Watanabe et al. .................. 364/424.02

FOREIGN PATENT DOCUMENTS 3103463  12/1993  Japan .

Primary Examiner—Michael Zanelli
Attorney, Agent, or Firm—Kenneth A. Seaman

[57] ABSTRACT

An apparatus and method for determination of a steering angle and velocity using distances from obstacles in a plurality of directions or changes in distances with time as input information; obtaining a function output for each of the directions using the input information as a parameter and using a function regarding steering angle, a function regarding velocity and a function regarding degree of danger; executing operations using each function output as a parameter to compute a steering angle for obstacle avoidance and also compute a steering angle for route tracing and a velocity by a predetermined method; and synthesizing the obtained steering angle for route tracing and for obstacle avoidance with a velocity as derived. The foregoing control method avoids obstacles and is comparatively simple, even in an unknown environment without constructing a complicated rule base.

8 Claims, 3 Drawing Sheets

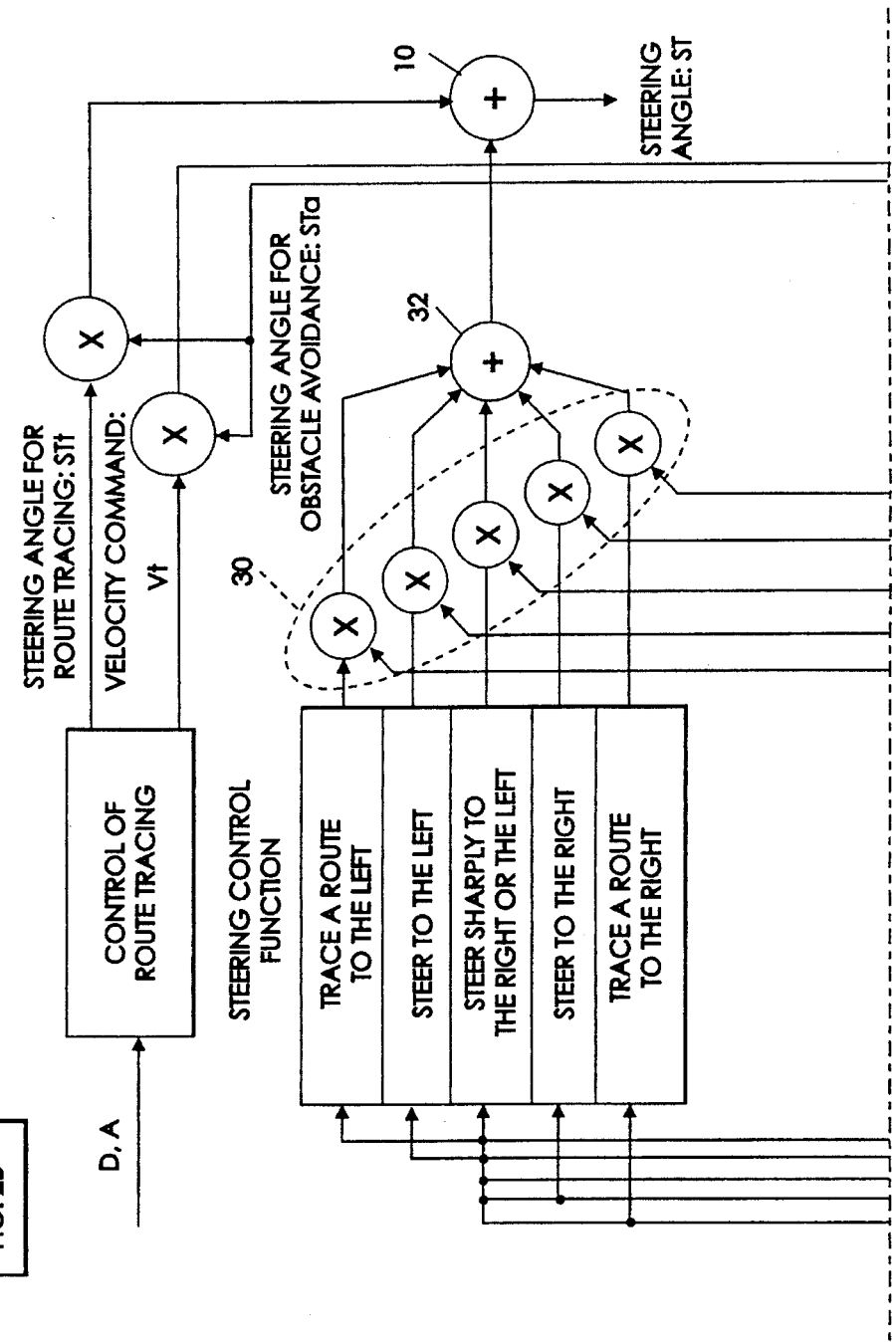

METHOD AND APPARATUS FOR AVOIDING OBSTACLES BY A ROBOT

FIELD OF THE INVENTION

The present invention relates to a method and apparatus for guiding an autonomous mobile robot or machine to a destination while avoiding stationary or moving obstacles that the robot encounters when it moves in accordance with information on the position of the robot and information on the distance from an obstacle near the robot. Particularly, the present invention relates to a method and apparatus for combining guidance information for avoiding collision with an obstacle and guidance information to direct the robot to a destination.

PRIOR ART

A mobile robot device autonomously (that is, under its own control) moving about in an environment (hereafter referred to as a mobile robot) has become useful in factories and offices in recent years. Because the mobile robot moves to reach a certain destination, a route to the destination must be set or determinable (the robot must have guidance information to the destination). If there is no obstacle near the robot, it may be possible for the robot to reach the destination with this guidance information alone. In general, however, there are various static and dynamic obstacles in the environment. For example, machines and walls installed on a floor are static obstacles, and a human being is a typical dynamic obstacle. Therefore, to achieve the expected objective of "reaching a destination," guidance information for avoiding an obstacle is necessary in addition to the function for guiding the robot to its destination.

For the mobile robot to avoid an obstacle, it must recognize its surroundings and take action in real time corresponding to the surroundings. Particularly when the obstacle is moving, parameters including the distance from the obstacle change due not only to the movement of the mobile robot but also to the movement of the obstacle, and therefore many techniques are necessary to reach the destination by effectively avoiding obstacles.

To achieve the goal of "reaching the destination" in such an environment, such methods are conventionally used as the method in which a robot pauses when it finds an obstacle and then restarts its movement by determining a subgoal in a direction which will not take it further from the destination (Replanning Subgoal Method). However, this method is impractical because it takes a lot of time to set the subgoal when the obstacle is moving, though the subgoal can easily be set when the obstacle is stopped. Therefore, the method is not suitable for a dynamic environment.

There is a second method in which, when the movement of a moving obstacle is known, a robot estimates a possible future location of the obstacle from the movement to determine its running route so that its future position does not contact the future position of the obstacle (access region inhibiting method). However, this method is not practically used though it is theoretically effective, because there is no sensor for detecting the movement and shape of the moving obstacle quickly and accurately. There is a similar method in which a route where a robot moves along a ridge line with the minimum potential field is set by converting the distance between an obstacle and the boundary of a free space into a certain potential field by using parameters while assuming that the movement of the obstacle is known. However, this method cannot be practically used either because of the limitations of the sensor technology.

To solve these problems, the inventor of the present invention has proposed a running guidance method using fuzzy control in Japanese Patent Application No. 3-103463 filed Dec.9, 1993 and hereby incorporated herein. by reference. This method is characterized in that the control for achieving an object is divided into route follow-up control and obstacle avoidance control, and fuzzy control is used to decide whether to emphasize the route follow-up control or the obstacle avoidance control depending on the surroundings. In this case, the route follow-up control is defined as the control to determine the proper direction and route for reaching a destination, and the obstacle avoidance control is defined as the control to determine the direction and route for effectively avoiding the obstacles which can approach at any moment. Of course, the decisions of the route follow-up control and the obstacle avoidance control can conflict depending on the direction from which the obstacle approaches (e.g. when the obstacle approaches from the direction of the destination). Therefore, to safely reach a destination without collision with an obstacle, a control system for adjusting the decisions of these types of control is necessary. The present invention is characterized in that the control system is executed using a certain fuzzy rule base.

Because this system makes it possible to use a simple sensor input model (distance deviation and angle deviation from a target route, processing for avoiding collision with an obstacle, distance between an autonomous mobile robot and a surrounding object, distance change per time, etc.), it is possible to overcome the limitations of sensor technology which make various methods described above impracticable. However, it is necessary to increase greatly the number of fuzzy rule bases in order to meet many complicated conditions. Therefore, there was a problem in the maintenance performance.

Moreover, as the number of rules increases further, the probability of inconsistent rules increases. For example, if one rule specifies steering to the right and another rule specifies steering to the left, a mobile robot proceeds straight on as a result. This type of trouble can easily occur when an obstacle is present in front of the robot, posing an essential problem of this principle.

Other limitations of the prior art systems will be apparent to those skilled in the art in view of the following summary of the invention and description of the preferred embodiment.

SUMMARY OF THE INVENTION

The primary advantageous effect of the present invention is to provide an apparatus and method in which an autonomous mobile robot determines the next action while judging its position and the situation of obstacles present on its running route and reaches a destination while avoiding obstacles; that is, a method in which the robot reaches the destination while avoiding obstacles which may move unexpectedly, based on only limited environmental information of a local region in the vicinity of the robot.

The method achieved by the present invention should not be a method exceeding the limits of sensors an essential problem of existing methods but should be able to handle an increased number of rule bases and internal inconsistency, which have been problems of a method involving fuzzy control.

The present invention is an obstacle avoiding apparatus and method for guiding an autonomous mobile robot to solve the above problems and relates to a method for final determination of a steering angle and velocity with distances from obstacles in a plurality of directional regions or changes of distances with time as input information, obtaining the function output for each directional region with the input information as a parameter and using a function relating to steering angle, a function relating to velocity, and a function relating to degree of danger, performing operations using each function output as a parameter to compute a steering angle for route tracing, a velocity for route tracing, a steering angle for obstacle avoidance, and a velocity for obstacle avoidance, and synthesizing the obtained steering angle for route tracing with that for obstacle avoidance and the obtained velocity for route tracing with that for obstacle avoidance.

Therefore, because obstacle avoidance uses information which is comparatively easily measurable for functions about velocity and direction as input data, it is unnecessary to construct a complicated rule base, and control using a very simple method is realized. Moreover, adoption of the concept of degree of danger makes the present invention superior in that it is possible to dynamically determine whether to emphasize the function for guiding a robot to a destination or the function for obstacle avoidance depending on the surroundings.

Other objects and advantages of the present invention will be apparent to those skilled in the art.

BRIEF DESCRIPTION OF THE DRAWINGS

FIGS. 2A and 2B, when arranged as shown in FIG 2, represents a chart showing the control method of the present invention.

DETAILED DESCRIPTION OF PREFERRED EMBODIMENT

Although it uses both a function for guiding a robot to a destination (route setting function) and an obstacle avoidance function, the present invention does not depend on the method of the former function. For example, there is a method in which a route is previously given by a planner before running and a list of line segments providing nodal point coordinates is given as route information, and a method in which a wall is assumed as a guiding route and the robot is guided to a destination along the wall. The present invention instead adopts a method related to the obstacle avoidance function and relates to a method for combining the obstacle avoidance function and the route setting function.

Figure 1:
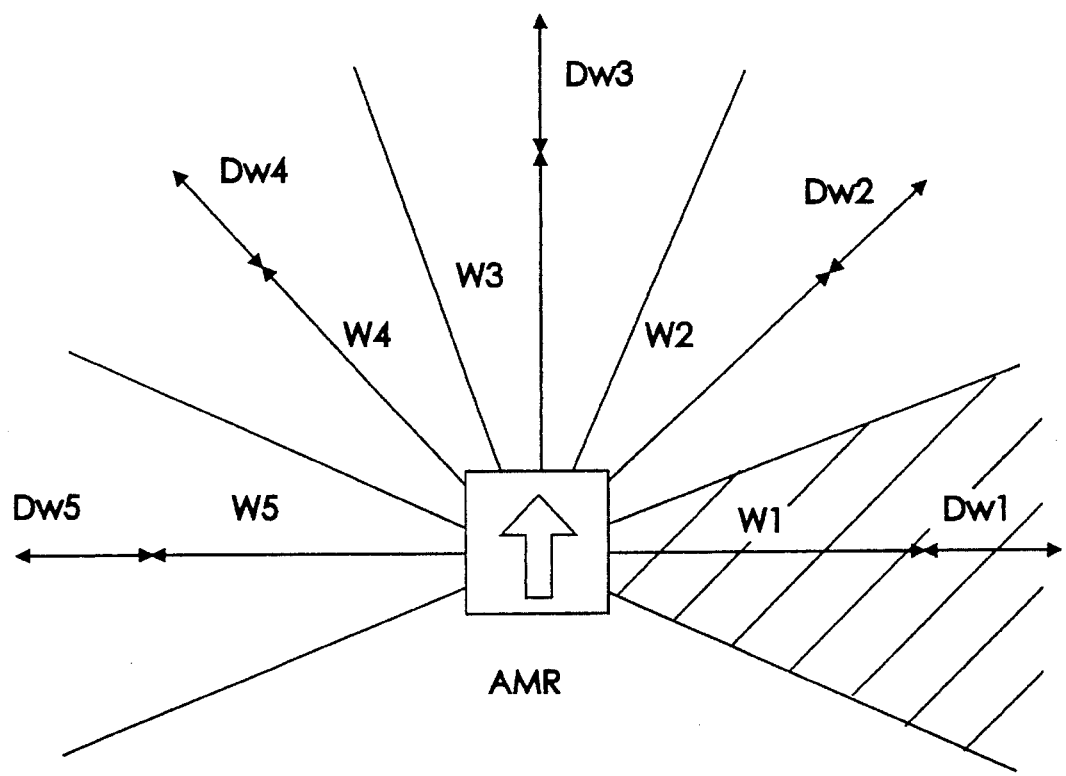
FIG. 1 is an illustration showing directional regions, distances from obstacles, and changes of distances with time.

Before describing the details of the present invention, distances (vacant air clearances) W1 to W5 from a plurality of obstacles present in the right and left directions, diagonally right and left directions, and forward direction are defined as shown in FIG. 1. In the case of this description, there are five directions given. However, the number of directions is not restricted to five, nor are the directions chosen the only directions possible to use. It is possible to decide the number of divisions in accordance with the effective region of a sensor, size of a mobile robot, or desired accuracy of movement. Specifically, an active-type range sensor (e.g. ultrasonic sonar or PSD-type infrared range sensor) can be used for the vacant air clearances W1 to W5. These sensors are practically available and therefore the present invention does not have the problem of the limitations of a sensor.

Figure 2B:
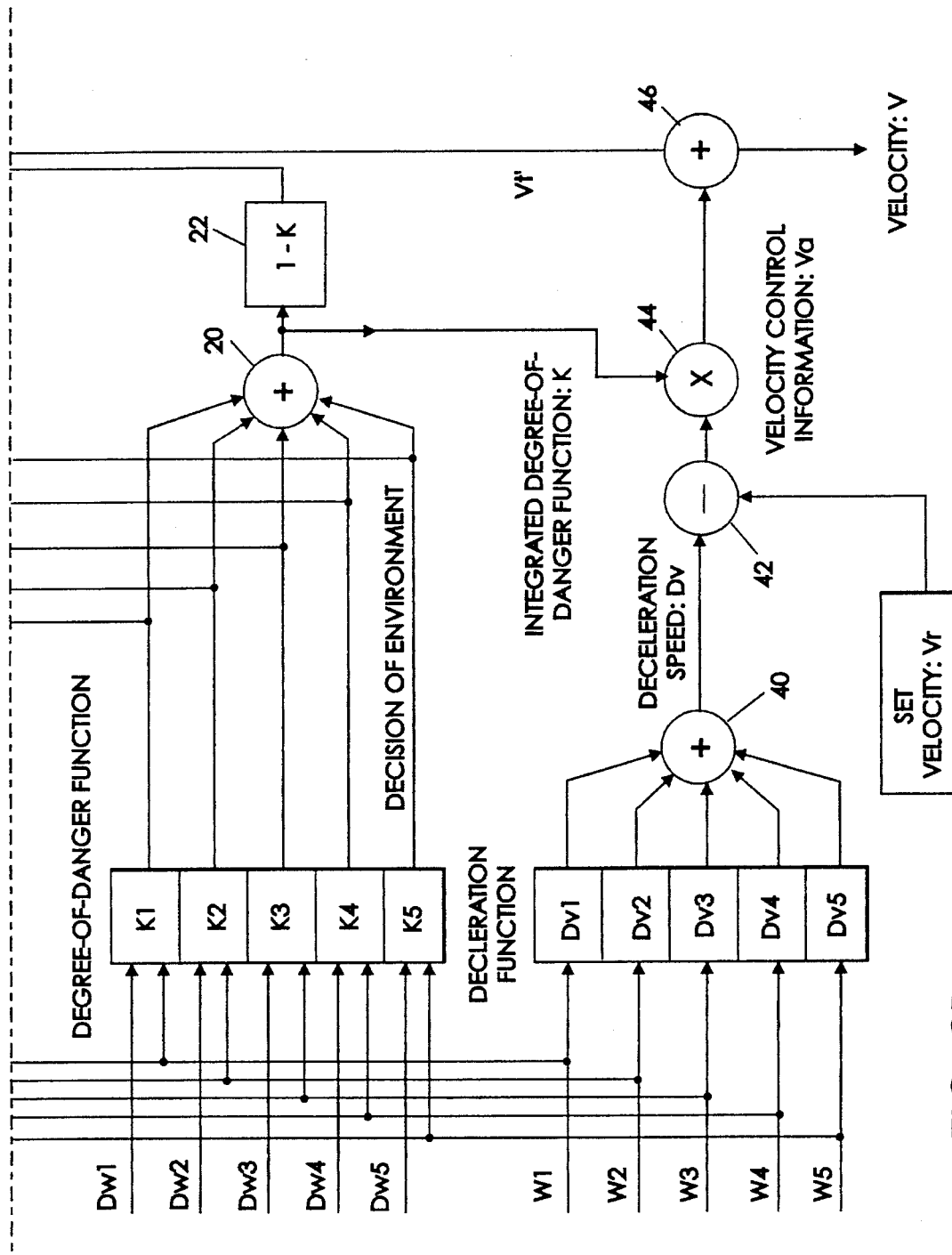

FIGS. 2A and 2b show the entire constitution of the present invention. To give a very general description of FIGS. 2A and 2B the inputs are vacant air clearances W1 to W5 and the changes of vacant air clearances with time dW1 to dW5. These data values are inputted as parameters to functions K1 to K5 showing degree of danger, a steering control function showing a steering direction (steering along a right or left wall, steering to the right or the left, or steering sharply to the right or the left), and deceleration functions Dvl to Dv5, and then processed. The result is brought under a certain integration as described below. As a result, the steering direction (steering angle) ST and the velocity V are outputted. A mobile robot is controlled in accordance with these output data values and the specified guidance is performed.

COMPUTATION OF DEGREE OF DANGER

The degree of danger is an index of the urgency of the possibility of collision with an obstacle in each directional region. The degree of danger is computed using the vacant air clearances W1 to W5 and defining a function so that the degree of danger increases as the vacant air clearance decreases. For example, the following expression seems appropriate.

$$K_n = \begin{cases} 1.0 \text{ if } \frac{F_n}{W_n} \geq 1.0 \\ \frac{F_n}{W_n} \text{ if } 1.0 > \frac{F_n}{W_n} > 0 \end{cases} \quad \text{[Formula 1]}$$

This embodiment uses a function system in which the degree of danger increases as the vacant air clearance decreases. In fact, However, it is a sufficient condition to embody the present invention to say that there is any correlation between the vacant air clearance and the degree of danger. Therefore, it is also possible to use a function in which the degree of danger decreases as the vacant air clearance decreases.

In this case, constants F1 to F5 serve as parameters showing from what distance a robot actually weights obstacle avoidance. As shown in the above expression, K equals 1 for Fi> Wi and 100% of weight is given to obstacle avoidance guidance. As the value of Fi increases, control places more emphasis on obstacle avoidance. However, the value to set depends on the area of the environment in which an autonomous mobile robot moves about.

It is also possible to use the changes of vacant air clearances with time Dwl to Dw5 to compute the degree of danger. In this case, the following type of expression seems appropriate as the function to be adopted.

$$K_n = \begin{cases} 1.0 \text{ if } \frac{F_n}{W_n} + \frac{F_{dn}}{DW_n} \geq 1.0 \\ \frac{F_n}{W_n} + \frac{F_{dn}}{DW_n} \text{ if } 1.0 > \frac{F_n}{W_n} + \frac{F_{dn}}{DW_n} > 0 \end{cases} \quad \text{[Formula 2]}$$

In this case, Fdn relates to Dwi, which is the same function as Fn.

STEERING CONTROL

For the steering control, the basic concept is whether to emphasize the route follow-up guidance or the obstacle avoidance guidance. That is, when emphasizing the former, a decision is made including more factors of the steering angle STt for route tracing showing the direction to a destination, and the final steering angle ST is determined. When emphasizing the latter, a decision is made including more factors of the steering angle STa for obstacle avoidance. This type of synthesis of STt and STa is performed by the operator 10. Thus, weighing which guidance to emphasize is done by computing, for example, the degree-of-danger function K integrated on the former with the operator 20 and thereafter executing the processing "1–K" inversely proportional to the value of the function K with the operator 22. In this case, the contribution of the steering angle STt for route tracing to the final steering angle ST decreases as the degree of danger K increases. The latter is evaluated by combining the products of the output of the function of steering angle and the degrees of danger for various directions in the operator set 30 and integrating the products with the operator 32. In this case, the contribution of the steering angle STa for obstacle avoidance to the final steering angle ST increases as the degree of danger K increases. Therefore, as the danger of collision increases, control emphasizes obstacle avoidance more and thus, the goal is attained.

The integrated degree-of-danger function K increases as the degree of danger in each direction rises. In the case of this method, as shown in FIGS. 2A and 2B the contribution to the steering angle STt for route tracing decreases as the integrated degree-of-danger function rises. In this case, however, because the degree-of-danger functions K1 to K5 are large, the contribution to the steering angle STa for obstacle avoidance increases. This is because steering is performed by putting more stress on obstacle avoidance as the degree of danger increases as a whole. By adopting this type of system, obstacle avoidance is effectively performed corresponding to the situation and when no obstacle is present, a robot can reach a destination through the shortest route.

The relation between individual divided directional region and steering direction is described below. For example, steering is extremely performed to right or left corresponding to the input parameter W3. This is because W3 is a parameter indicating that an obstacle exists ahead, and thus the above steering operation is indispensable to avoid the obstacle. In this case, it is only necessary to temporarily perform the steering operation to either right or left to avoid the obstacle. Actually, however, steering is performed in the direction of a more widely open space by considering the danger of encountering an obstacle later. Therefore, this decision is made by using other parameters W1, W2, W4, and W5. In this case, it is also effective to refer to route information indicating the steering direction.

Moreover, steering is performed to the right or left corresponding to W2 or W4 respectively. This is because each parameter decreases when an obstacle is present at the right or left side respectively. A steering operation is performed so as to avoid approaching the object because W1 and W5 are parameters indicating that an object is present at the right or left respectively.

This steering operation is performed using a steering control function. Specifically, this function is used to compute the angle for steering to the right or the left.

For example, the function ST1 "steering to the left" is expressed as ST1=+L/W2. In this case, a steering angle to the left is expressed as +. Therefore, the function STr "steering to the right" is expressed as STr=−L/W4. In this case, L is a constant. A function "for tracing a route to the left" is expressed as, for example, "ST1=+K (W1−rd)(rd:reference distance constant). In this case, the reference distance constant rd is a constant for a robot to run along a route the distance of rd apart from a lateral object. Thus, steering angles to the right and the left are respectively computed from each steering function, multiplied by the degree of danger (30), and finally synthesized (32).

Velocity Control

For this embodiment, velocity control is performed by decelerating a robot from a set velocity. However, when detailed movement of a moving obstacle can be described, it may be possible to avoid the obstacle by accelerating the robot. Therefore, whether to use deceleration or acceleration for obstacle avoidance may also become a design problem. However, it is considered that the deceleration method is better because an obstacle can easily be avoided without detailed data on the shape and movement of the obstacle.

In FIGS. 2A and 2B an example of the deceleration function Dv is defined as shown below for each directional region.

$$K_n = \begin{cases} D_{vo} \text{ if } \frac{F_{vn}}{W_n} \geq 1.0 \\ D_{vo} \times \frac{F_{vn}}{W_n} \quad 1.0 > \frac{F_{vn}}{W_n} > 0 \end{cases} \quad \text{[Formula 3]}$$

In the above expression, Dvo is a constant having a dimension of velocity. Fv1 to Fv5 are also constants. It is necessary to use constants in which deceleration increases as a vacant air clearance decreases for the constants Fv1 to Fv5, similarly to F1 to F5, which were previously described. The final deceleration Dv is obtained by accumulating Dv1 to Dv5 with the operator 40. A command for avoiding an obstacle is obtained by computing a value obtained by subtracting the deceleration Dv from a set velocity with the operator 42. The computed value is multiplied by a degree of danger (44) and the obtained velocity is synthesized with the velocity command Vt for route tracing (46). As a result, a velocity meeting both the requirements for obstacle avoidance and those for route tracing is finally determined. In this case, it is preferable that the velocity command Vt be larger than the set velocity Vr. Otherwise, a phenomenon occurs because of computation in which acceleration is performed to avoid an obstacle.

For example, a case in which the degree of danger is low (a case in which W1 to W5 are large overall) is compared with a case in which the degree of danger is high (a case in which W1 to W5 are small overall) using concrete numerical values as shown below. In this case, because the velocity command Vt, set velocity Vr, and DvO are constants, it is assumed that Vt is 30, Vr is 20 (any unit can be used), and DvO is 4.

It is assumed that K equals 0.3 when the degree of danger is low. For ease of understanding, when assuming that Fvn/Wn equals 0.2 for each directional region, the deceleration Dvi for each directional region is 4×0.2=0.8 and Dv comes to 0.8×5=4. By subtracting these values from the set velocity Vr and multiplying them by the degree of danger K, Va is obtained as 4.8. Because the velocity for route tracing is expressed as "Vt×(1−K)," the result is "30×(1−0.3)=21. By adding these values, the velocity V when danger is 0.3 comes to 4.8+21=25.8.

Next, for a case in which the degree of danger is high, for example, K is assumed to equal 0.9. In this case, if Fvn/Wn equals 0.95, the velocity Dvi for each directional region is 4×0.95=3.8 and Dv comes to 3.8×5=19. By performing the same computation as that mentioned above, Va=0.9 and Vt=3 are obtained and accordingly, V comes to 3.9. Therefore, the velocity can be adjusted by the above method corresponding to the degree of danger or distance from an obstacle.

ADVANTAGES OF THE INVENTION

The method of the present invention evaluates steering velocity and direction by simple functions in accordance with input parameters and degrees of danger instead of constructing a complicated rule base. Therefore, it is unnecessary to construct a complicated rule base and moreover it is possible to properly avoid obstacles in an uncharted environment using a comparatively simple sensor.

Of course, many modifications of the present system will be apparent to those working in the field without departing from the spirit of the present invention. Further, some of the features disclosed may be used without the corresponding use of other features. Accordingly, the foregoing description of the invention should be considered as merely illustrative of it and not in limitation thereof.

Having thus described the invention, what is claimed is:

1. A method of guiding an autonomous mobile machine for determining a guiding steering angle and a guiding velocity value to guide the machine, the steps of the method comprising:

using distances from obstacles in a plurality of directions as input information;

obtaining an output for each of said directions, using said input information as a parameter and using a function relating to steering angle, a function relating to velocity, and a function relating to degree of danger;

calculating a steering angle for obstacle avoidance and a velocity for obstacle avoidance by using at least one of said outputs for each of said directions as a parameter and a steering angle for route tracing and a velocity for route tracing by a predetermined method; and controlling the machine using said guiding steering angle by synthesizing said steering angle for route tracing and said steering angle for obstacle avoidance and said guiding velocity value by synthesizing said velocity for route tracing and said velocity for obstacle avoidance.

2. The guiding method according to claim 1, further including a differential by time of said distances from obstacles in a plurality of directions as input information to obtain said output of a function relating to degree of danger.

3. The guiding method according to claim 1, wherein said velocity for obstacle avoidance is smaller than a preset value.

4. The guiding method according to claim 1, wherein the step of obtaining an output related to the degree of danger includes the step of increasing the value of the output as the distances from obstacles in one of said directions decrease, and the step of using a function related to velocity includes decreasing that velocity as the degree of danger increases.

5. The guiding method according to claim 4, wherein said function relating to steering angle is used to compute said steering angle for obstacle avoidance and said function relating to velocity is used to compute said velocity for obstacle avoidance.

6. The guiding method according to claim 1, wherein the step of obtaining an output related to the degree of danger includes the step of decreasing the guiding velocity value as the distance from obstacles in one of said directions decreases and the step of calculating a steering angle for obstacle avoidance includes the step of increasing that angle when the degree of danger decreases.

7. The guiding method according to claim 6, wherein said function relating to steering angle is used to compute said steering angle for obstacle avoidance and said function relating to velocity is used to compute said velocity for obstacle avoidance.

8. An apparatus for controlling a robot comprising:

means for determining a distance from obstacles in each of a plurality of directions;

means for calculating an output for said plurality of directions based upon input parameters using a function of present steering angle, a function of velocity and a function based on a perceived degree of danger;

means for calculating a new steering angle for avoiding said obstacles and a new velocity using said output for said plurality of directions, using a predetermined formula; and means for generating a guiding steering angle by synthesizing said steering angle for route tracing and said steering angle for avoiding obstacles and for generating a guiding velocity by synthesizing said velocity for route tracing and said velocity for avoiding obstacles with means using the calculated steering angle and the velocity for controlling the robot.

\* \* \* \* \*